Figure 2:
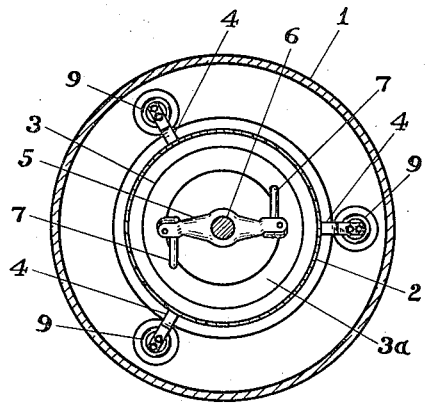

Nov. 28, 1939.   V. F. HANSON   2,181,759
APPARATUS FOR PRODUCING CARBON BLACK
Filed Dec. 31, 1936   2 Sheets-Sheet 1

INVENTOR.
VICTOR F. HANSON
BY
ATTORNEY

Nov. 28, 1939.  V. F. HANSON  2,181,759

APPARATUS FOR PRODUCING CARBON BLACK

Filed Dec. 31, 1936  2 Sheets-Sheet 2

INVENTOR.
VICTOR F. HANSON
BY *Theodore ?. Budrow*
ATTORNEY.

Patented Nov. 28, 1939

2,181,759

UNITED STATES PATENT OFFICE 2,181,759

APPARATUS FOR PRODUCING CARBON BLACK

Victor F. Hanson, Niagara Falls, N. Y., assignor to E. I. du Pont de Nemours & Company, Wilmington, Del., a corporation of Delaware Application December 31, 1936, Serial No. 118,611

5 Claims. (Cl. 204—31)

This invention relates to the decomposition of carbonaceous liquids and more particularly to the production of carbon black by electrothermal decomposition of carbon-bearing liquids by means of a submerged electric arc, and to an apparatus in which such production may be excellently carried out.

The dissociation of liquid carbonaceous materials by means of a submerged electric arc to produce carbon black and gaseous products has long been known. By means of such a method, carbonaceous liquids, such as hydrocarbon oils, molten organic compounds, and the like, may be used as a source of acetylene, carbon black, or both. When carbon black is the most valuable product, it is advantageous to employ a method and apparatus that produce as high yields as possible of carbon black. One method that has been proposed for increasing the conversion of carbon-bearing oils to carbon black is to carry out the electrothermal decomposition of the oil by using a carbon-bearing oil having a high content of suspended carbon black as the medium in which the electric arc is submerged.

A particular object of the present invention is to provide an electrothermal method for obtaining an increased yield of carbon black from carbon-bearing liquids. A further object is to provide a method and apparatus therefor by which improved yields of carbon black per unit of electric energy and per unit of equipment may be realized. Other objects will be apparent from the ensuing description of my invention.

The above objects are accomplished in accordance with the present invention by increasing the content of gaseous decomposition products of the carbon-bearing liquid in the vicinity of the submerged arc. This may be effected conveniently by surrounding the arc region with a suitable baffle. Obviously, the type of baffle that should be used will depend upon the type of equipment employed to produce the arc. Therefore, my invention is not limited to the use of any one particular type of baffle. In its broadest aspects my invention comprises a method of increasing the content of gaseous decomposition products in the liquid being decomposed in the vicinity of the dissociating arc and in an apparatus for producing carbon black adapted to effect such an increased gaseous content in the vicinity of the submerged arc.

I have found that by increasing the gaseous content of the carbon-bearing liquid in the vicinity of the arc the production of carbon black may be approximately doubled for a given unit of equipment and that substantially less electric energy will be required to produce a unit weight of carbon black. In general, my process and apparatus make possible a substantially more economical production of carbon black by electrothermal methods than has been heretofore obtainable.

A convenient method for increasing the content of gaseous decomposition products in the vicinity of the arc is to surround the arcing region with a baffle means adapted to partially confine the gaseous decomposition products within the arcing vicinity. This method is especially effective when one of the electrodes employed is relatively fixed and the other is rapidly rotated. Under such conditions, the gases produced during the decomposition are partially and momentarily retained within the vicinity of the arc. Due to this retainment of gases, together with the rapid rotation of one of the electrodes, the medium between the electrodes takes on a foamy consistency. The net result is that the arcing is caused to take place across a partially gaseous medium instead of across a substantially homogeneous liquid medium as is the case in methods hitherto employed.

Vigorous agitation of the carbon-bearing oil in the arcing zone is desirable. If one or more rotating electrode is employed, effective agitation is generally produced by the rotation of the electrode. If stationary electrodes are employed, I prefer to rapidly agitate the hydrocarbon in the vicinity of the arc by an agitator operated independently of the electrodes. Any of the common means for agitating may be effectively employed, but I prefer to use a rapidly rotating agitator. Vigorous agitation in the vicinity of the arc increases the effectiveness of the baffle and cooperates with the baffle to partially confine gaseous decomposition products in an especially effective manner in the arcing zone.

My invention may be further illustrated by reference to the accompanying drawings and in particular to Figures 1 and 2 which show various views of one form of apparatus that is especially suitable for practicing my novel method of producing carbon black. While Figures 1 and 2 illustrate one modification of my preferred apparatus, it is to be understood that my invention may be practiced using various modifications of the apparatus illustrated, or even other types of apparatus, without departing from the scope of my invention.

Figure 1:
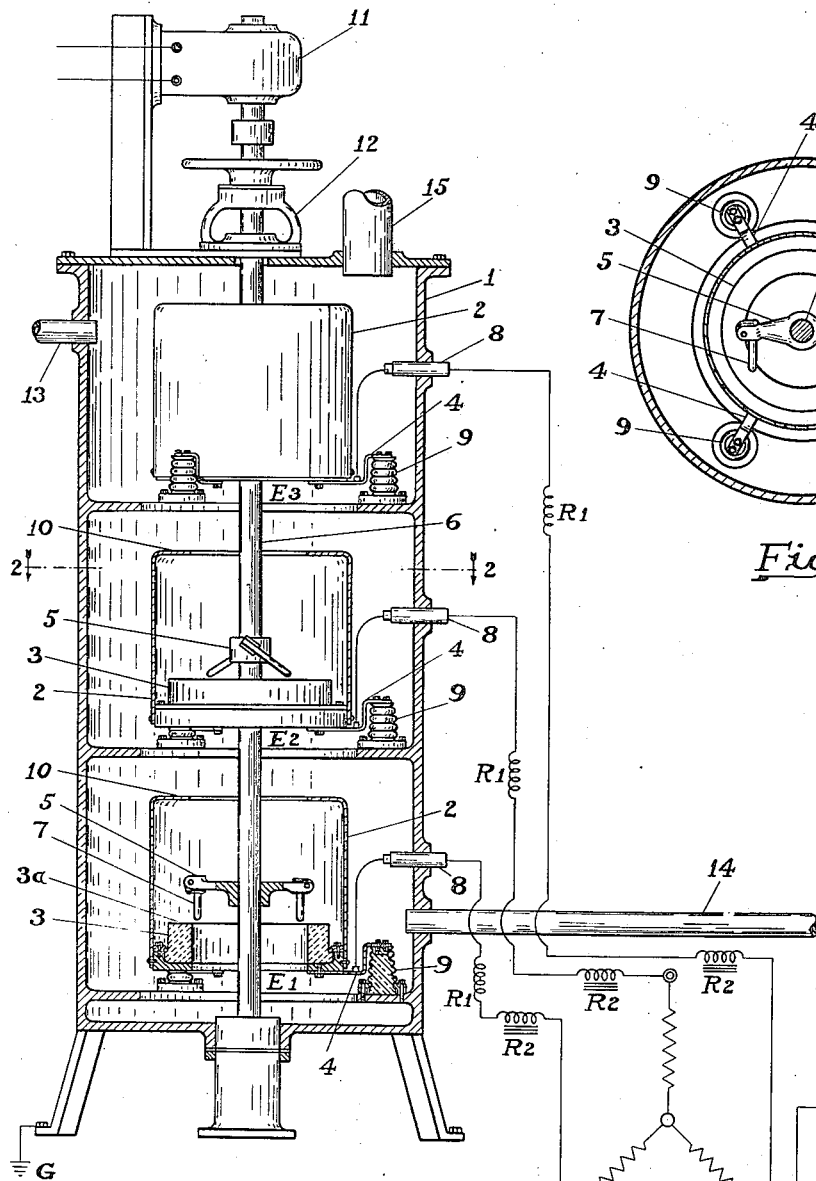

Figure 1 shows a vertical section, partially in elevation, of one modification of my preferred apparatus, and Figure 2 shows a cross-sectional view of the carbon black treater or dissociation chamber shown in Figure 1, taken on line 2—2 therein.

The treater consists essentially of a casing 1 provided with a plurality of electrode units $E_1$, $E_2$ and $E_3$ mounted within said casing and surrounded by baffles 2. Each of the three electrode units shown comprises a relatively fixed electrode and one or more rotatable electrodes. Three electrode units, or a multiple thereof, preferably are employed since such a number is most effectively energized from a three phase power supply circuit.

Each electrode unit includes a fixed ring shaped electrode 3 having a comparatively small width in proportion to its circumference. The ring electrode 3 is positioned in a plane approximately perpendicular to its axis and is supported within casing 1 by the mounting means 4. Each unit further includes a rotatable electrode holder 5 which is mounted upon a rotatable shaft 6 and which has one or more radial arms, each bearing a rod shaped electrode 7 of comparatively small cross section. The electrodes 7 are disposed over a corresponding upper or arcing surface 3a of the ring electrode 3 and are inclined rearwardly with respect to the direction of travel of said electrode at a suitable trailing angle. The electrodes 3 and 7 may be of any suitable conducting material, for example, they may be carbon electrodes produced in the same general manner as the ordinary carbon electrodes commonly employed for maintaining electric arcs.

The respective electrodes may be fitted with suitable connections for supplying electric energy at the desired voltages as shown in Figure 1. The ring electrodes may be connected each to a separate phase of a three phase power supply system comprising a suitable transformer T through the power lead insulators 8 and suitable impedances R1 and R2. The electrode insulators 9 insulate the ring electrodes 3 from casing 1. The rotating electrodes of the various electrode units, which are mounted upon the common shaft 6 extending longitudinally through casing 1, are grounded as at G.

The arcing zones are surrounded each by the cylindrical baffle 2 which is coaxial with the ring electrode 3. The bottom of the baffle is mounted outwardly from the ring electrode upon mounting means 4 and the top of each baffle is preferably provided with an inwardly extending flange 10. The flange 10 has a comparatively small width in proportion to its circumference.

The baffle assembly, as well as the entire assembly within casing 1, is preferably arranged symmetrically around the ring electrodes so that the latter will disintegrate evenly and tend to maintain its ring structure.

The treater is provided with suitable driving means, for example, a variable speed motor 11, for rotating shaft 6 and with an adjustment means as shown at 12 for maintaining and adjusting the separation of the rotatable electrodes from the fixed electrodes through longitudinal movement of the shaft 6. The treater is further provided with an inlet conduit 13 for delivering hydrocarbon oil to the treater, an outlet conduit 14 for delivering carbon-bearing liquid from the treater to equipment not shown for separating carbon black, and a gas conduit 15 for delivering gaseous decomposition products to a gas scrubber or holder, likewise not shown. If desired, the incoming oil may be preheated by passing it in heat exchange relationship with the hot off-gases prior to its introduction into the treater.

Figure 3:
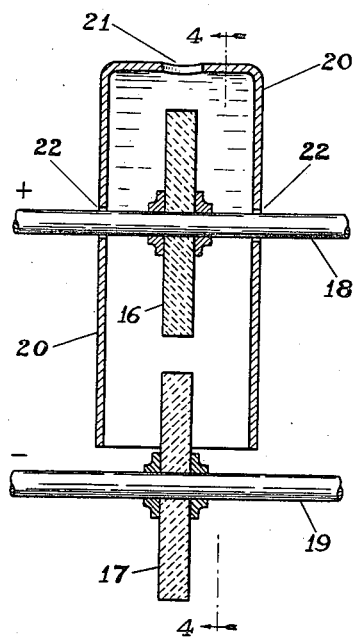
Figure 4:
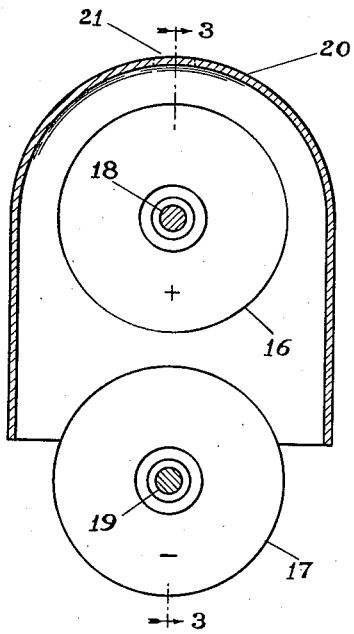

Figures 3 and 4 show an arrangement of a baffle about a pair of rotating disc electrodes that is effective in increasing the content of gaseous decomposition products in the arcing zone in accordance with the present invention. Figure 3 is a longitudinal section taken on plane 3—3 of Figure 4 and Figure 4 is a transverse section taken on plane 4—4 of Figure 3. In both figures, disc electrodes 16 and 17 are supported on shafts 18 and 19, respectively, which are provided with mounting and rotating means not shown. The electrodes are surrounded by baffle 20 which forms a bottomless casing around the upper electrode 16 and around the upper portion of the bottom electrode 17. Baffle 20 is provided at the top with an opening 21 through which gases may escape into the treater proper and also with openings 22 through which shaft 18 passes. Baffle 20 may be supported by any suitable means from the walls of a suitable container for liquid hydrocarbon in which the arcing unit is used. Electrodes 16 and 17 may be connected through shafts 18 and 19, respectively, to suitable electric power source.

Figure 5:
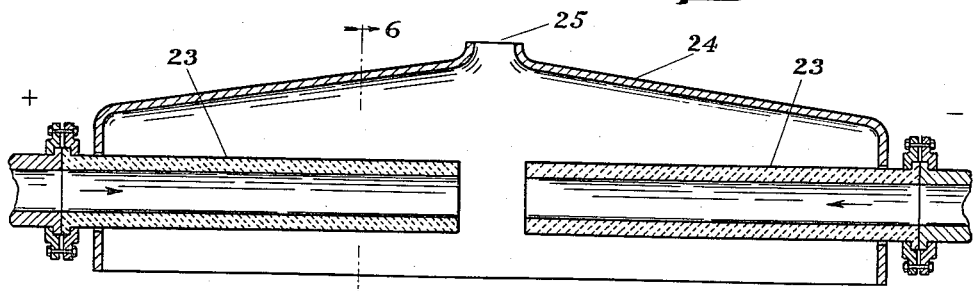
Figure 6:
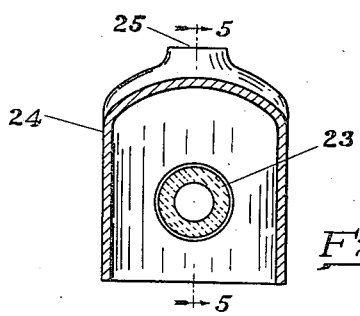

Figures 5 and 6 show an arrangement of a baffle about stationary electrodes of the hollow tube type which also may be used effectively in accordance with the present invention to increase the production of carbon black. Figure 5 is a longitudinal section taken on plane 5—5 of Figure 6 and Figure 6 is transverse section taken on plane 6—6 of Figure 5. Electrodes 23 are hollow electrodes through which the carbon-bearing liquid is circulated by means not shown. Electrodes 23, which may be connected to any suitable electric power source, are surrounded over approximately their entire length by baffle 24. This baffle is conveniently constructed to form a bottomless and somewhat conical hood over and around the electrodes 23 and the arcing zone. The top of baffle 24 is provided with an opening 25 through which gases may escape into the main body of the treater. Baffle 24 may be supported in the desired position from the walls of a suitable container for liquid hydrocarbon by any suitable mounting means.

The effectiveness of increasing the content of gaseous decomposition products in the vicinity of the dissociating arc is readily apparent from the following data obtained in two experiments carried out in equipment substantially the same as that shown by Figures 1 and 2, except that in one experiment no baffle was employed around the arcing zone while in the other baffles similar to those illustrated in Figures 1 and 2 were used. The carbon black content of the carbon-bearing oil was maintained at approximately 10% during both experiments.

*Example*

|  | Baffles | No baffles | Date calculated to 24-hour basis | |
|---|---|---|---|---|
|  |  |  | Baffles | No baffles |
| Time of run in hours | 8.7 | 21.6 |  |  |
| Average kw. load | 167 | 145 |  |  |
| Average arc volts | 3,400 | 3,000 |  |  |
| Average arc amperes | 20 | 20 |  |  |
| Average kva | 430 | 430 |  |  |
| Average power factor percent | 39 | 34 |  |  |
| Pounds carbon black produced | 369 | 591 | 1,020 | 655 |
| Kwh consumed/lb. carbon black produced |  |  | 3.9 | 5.3 |
| Pounds carbon black produced/gallon of oil consumed |  |  | 2.64 | 2.37 |

The above data clearly demonstrates the advantages of increasing the content of gaseous decomposition products in the vicinity of the arcing zone which results in increased yields of carbon black.

It is known that the conversion of hydrocarbon oils to carbon black may be increased by increasing the amount of carbon black suspended in the oil being treated. For example, it has been proposed to employ carbon black concentrations of from 5-15%. While I have found it desirable to have present appreciable quantities of suspended carbon black, I find it objectionable to employ too high a concentration since under such condition the oil medium becomes too viscous for successful operation with my process. Oil containing from 5 to 12% and preferably from 8 to 11% of suspended carbon black may be effectively used when practicing my invention.

The present invention is not limited to apparatus employing one or more rotating electrodes nor to the particular type of rotating electrode shown in Figures 1 and 2 of the accompanying drawings. If desired, the electrode units, or unit, may comprise two rotating disc electrodes which may be surrounded by a baffle means as shown in Figures 3 and 4. Similarly, agitation of the carbon-bearing medium in the arcing vicinity may be effected by any suitable means, for example, by agitators operated independently of the electrodes. When stationary electrodes are employed, e. g., stationary electrodes of the hollow tube type through which oil is rapidly circulated, the arcing zone may be covered by a baffle arrangement such as is shown in Figures 5 and 6, which serves momentarily to confine the gaseous decomposition products within the arcing vicinity and thus to increase the concentration of such gaseous products therein. In any case, it is but a simple matter to supply the system with a baffle that will serve to increase the gaseous content of the medium in the vicinity of the electric arc.

While I have illustrated, for example, in Figures 1 and 2 a cylindrical baffle bearing an inwardly extending flanged portion at its upper end, I do not wish to be limited by such illustration. Obviously, the shape of the baffle may be modified in various manners and flange 10 omitted entirely without departing from the scope of the present invention.

It will be appreciated that my method and apparatus for producing carbon black afford distinct advantages over methods and apparatus heretofore employed. In particular, substantial savings are possible as a result of the superior yields of carbon black per unit of electric energy and per unit of equipment that are obtainable by means of my process and apparatus.

My invention is suitable for producing carbon black by electrothermal decomposition of various carbon-bearing liquids such as liquid carbonaceous materials, hydrocarbon oils, molten hydrocarbons and other liquid or molten organic compounds and the like. I use the term "carbon-bearing oil" in the appended claims to designate carbon-bearing liquids generally as illustrated by the above substances.

I claim:

1. An apparatus for producing carbon black from carbon-bearing oil comprising in combination an electrode unit within a reaction chamber, said unit comprising opposing electrode elements defining an arc gap between the opposing surfaces of said elements, said chamber being provided with means for maintaining a body of oil within said chamber above the level of said arc gap, electric power means connected to said electrode elements, means for agitating oil within said container within the vicinity of said arc gap and means for partially confining gaseous decomposition products within said vicinity of said arc gap.

2. An apparatus for producing carbon black from carbon-bearing oil comprising in combination at least one electrode unit positioned within a reaction chamber, said unit comprising a relatively fixed ring electrode element opposing a rod electrode element disposed over the corresponding upper or arcing surface of said ring electrode element, means for causing said rod electrode element to rotate circularly over said arcing surface of said ring electrode element, means for adjusting and maintaining the separation of said elements, power supply means connected to said elements to strike an arc between their opposing surfaces, means for maintaining a body of oil within said chamber above the level of said arc, and a cylindrical baffle mounted around said electrode unit so as to partially confine gaseous decomposition products within the vicinity of said electrode unit.

3. An apparatus for producing carbon black from carbon-bearing oil comprising in combination at least one electrode unit positioned within a reaction chamber, said unit comprising a relatively fixed ring electrode element opposing a rod electrode element disposed over the corresponding upper or arcing surface of said ring electrode element, means for causing said rod electrode element to rotate circularly over said arcing surface of said ring electrode element, means for adjusting and maintaining the separation of said elements, power supply means connected to said elements to strike an arc between their opposing surfaces, means for maintaining a body of oil within said chamber above the level of said arc, and a cylindrical baffle mounted around said electrode unit so as to partially confine gaseous decomposition products within the vicinity of said electrode unit, said baffle unit being mounted substantially coaxially with said ring electrode element and having an inwardly extending flange at the upper end thereof.

4. In an apparatus for producing carbon black from carbon-bearing oil by means of a submerged electric arc, the combination of a means for agitating a liquid medium in the vicinity of said electric arc together with a baffle means enveloping said arc for partially confining gaseous decomposition products within said vicinity so as to increase the gaseous content of a liquid medium therein.

5. In an apparatus for producing carbon black from carbon-bearing oil by electrothermal decomposition, the combination of an electrode unit comprising a ring electrode element and a rotatable rod electrode element disposed over the arcing surfaces of said ring electrode element, and a cylindrical baffle surrounding said ring electrode element and coaxial therewith.

VICTOR F. HANSON.